(No Model.)
H. B. DIERDORFF.
SELF LUBRICATING WHEEL.
No. 559,573. Patented May 5, 1896.
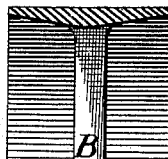
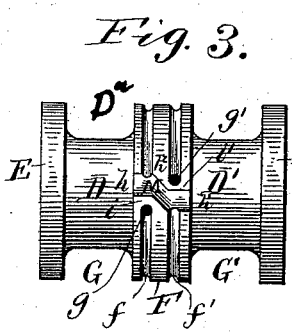
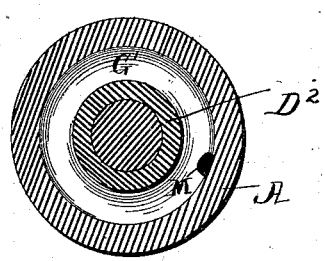
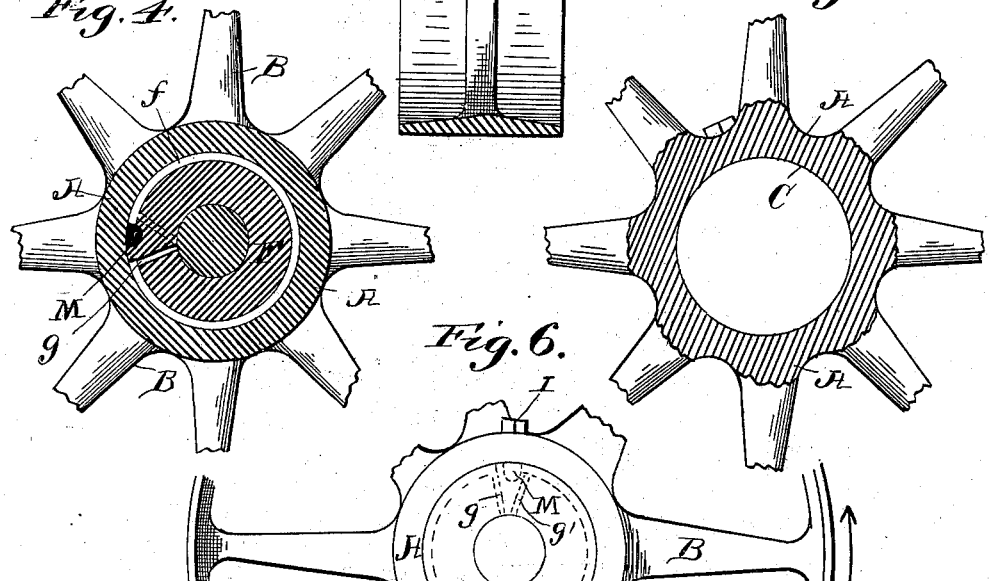
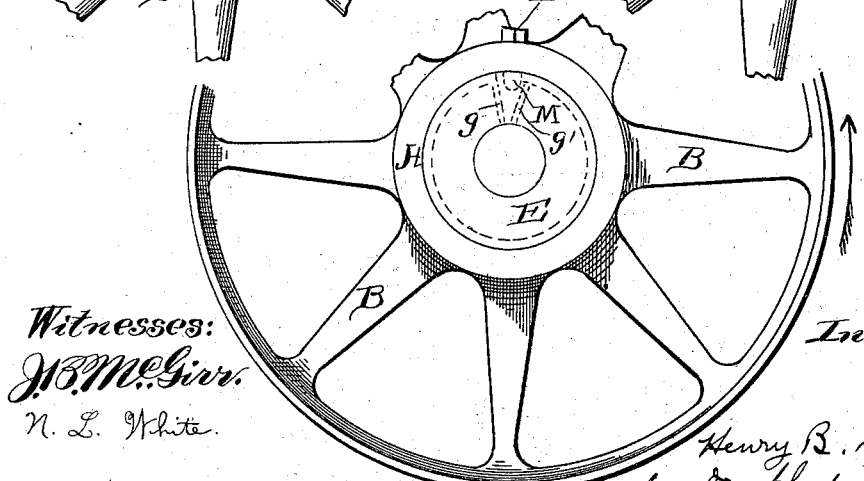
Witnesses:
J. B. McGinn.
N. L. White.
Inventor:
Henry B. Dierdorff
by Doubleday & Bliss
attys

UNITED STATES PATENT OFFICE.

HENRY B. DIERDORFF, OF COLUMBUS, OHIO, ASSIGNOR TO JOSEPH A. JEFFREY, OF SAME PLACE.

SELF-LUBRICATING WHEEL.

SPECIFICATION forming part of Letters Patent No. 559,573, dated May 5, 1896.

Application filed April 22, 1889. Serial No. 308,112. (No model.)

*To all whom it may concern:*

Be it known that I, HENRY B. DIERDORFF, a citizen of the United States, residing at Columbus, in the county of Franklin and State of Ohio, have invented certain new and useful Improvements in Self-Lubricating Pulleys and Wheels, of which the following is a specification, reference being had therein to the accompanying drawings.

This invention relates to improvements in devices for automatically lubricating the hubs of wheels and pulleys and the axles or shafts fitted on them.

Figure 1 is a longitudinal section of a wheel having my improvements applied thereto. Fig. 2 shows the hub in section. Fig. 3 is a side view of the bushing. Fig. 4 is a cross-section on line $xx$, Fig. 1. Fig. 5 is a section on line $yy$, Fig. 1. Fig. 6 is a face view of the parts when put together.

In the drawings a wheel is represented having a hub portion A and a web or spokes B. These may be considered as forming parts of a loose pulley, such as is used in many places in machinery or portions of a car-wheel or a wheel for any one of numerous vehicles. The hub A is hollow—that is, it has a cylindrical opening C for the shaft. Into this hub is inserted a movable bushing $D^2$, having the thinner parts D D', end flanges E E', and a central flange or outwardly-projecting part F. The end flanges, the central part F, the narrow parts D D', and the hub A together provide two oil-chambers G G', which extend continuously around the parts D D' and communicate with each other through a passageway provided by the groove M $h$ $h'$ $h^2$ in the central projection F. The end parts $h$ $h'$ of this groove are parallel to the axis of the hub, but the central part $h^2$ is inclined somewhat, for a purpose to be described. In the periphery of the flange or projecting part F the grooves $f f'$ are formed to serve as oil-ducts, one of them, as $f$, communicating with the part $h$ and the other, $f'$, with the part $h'$ of the transverse passage-way. Neither of these grooves or ducts extends entirely around the periphery of the central flange. One terminates in or communicates with an aperture or duct $g$, which extends radially, or nearly radially, inward toward the axis, the periphery of the flange being left solid and complete at $i$. The other groove $f'$ extends in the opposite direction from the transverse passageway part way around the central flange and terminates in or communicates with the aperture or duct $g'$, there being a part of the periphery of such central flange, at $i'$, left solid and complete.

When the wheel is turning in the direction of the arrow, Fig. 6, the oil in chamber G will be drawn into the passage $h$ and groove or duct $f$ and by centrifugal action will be carried around said duct until it reaches the aperture at $g$, where it can pass inward to the journal, spindle, or shaft. When the wheel is turning in the opposite direction, the oil is drawn in from chamber G', through groove $f'$, to aperture $g'$. In either case it will be seen that a portion of the oil is at all times held under the pressure of centrifugal action ready to pass into the shaft or journal. The inclined part $h^2$ of the transverse passage acts to cut off the oil from one chamber to the other and compel it to pass through one or the other of the peripheral grooves.

The solid peripheral parts of the central flange F at $i$ $i'$ serve as stops, one at the end of each of the grooves or ducts $f f'$, to prevent the oil from moving in one direction in each duct and also to prevent it from moving past the apertures $g$ $g'$. This is in contradistinction to those constructions in which use has been made of radial holes and of grooves between the radial holes and the main oil-chamber, the last said grooves, however, extending laterally in both directions from the radial holes, so that it was possible for the oil to move across the outer ends of the latter and again reach the oil-chamber—that is to say, they have no stops to prevent the passage of the oil in one direction. The bushing being removable, it can be readily taken out and another substituted therefor. There is a filling-aperture at H, closed by a screw I, which can be withdrawn when it is desired to fill the oil-chambers. It will be seen that I provide an oil-chamber of such depth that it approaches relatively near to the shaft and interpose between that chamber and the ingoing holes $g$ $g'$ grooves which are at an angle to the holes. As shown, the intermediate grooves are on the arcs of circles and on lines farther from the shaft-aperture than the bottom of the oil-chamber. The walls of these grooves are sufficiently tight to separate them from the oil-chamber. As a consequence of their presence the last of the oil in the chamber will be guided to the ingoing holes $g$ $g'$, no matter how great the centrifugal force. In fact, the greater the centrifugal force the greater will be the pressure exerted upon the oil to cause it to reach the holes $g$ $g'$.

I am aware of the fact that use has been made of an oil-chamber and holes such as those at $g$ $g'$ connected directly together, the last said holes being formed in projections extending out from the core of the bushing, but without an interposed closed groove between the main chamber and the ingoing hole and situated farther from the axial line than the bottom of the main chamber. There are serious difficulties to be met with in the earlier construction referred to, for when the wheel is revolving rapidly the oil is forced by centrifugal action past the hole leading to the shaft-aperture, whereas, as before said, in my device the oil is forced directly into the said hole instead of being allowed to flow past it; but, while the above is true, it will be noticed that the oil-chamber is unbroken—that is to say, is open or unobstructed around the axis, and there is no impediment to the free flow of the oil.

I do not wish to be understood as limiting myself to having two grooves leading in opposite directions, for my device may be used with a pulley that rotates constantly in one direction—that is to say, I may construct the bushing with but two flanges instead of three, forming the grooves $f$ and $g$ in one of the flanges, having of course the duct $h$ communicating with said duct $f$ from the oil-chamber. Such a construction would be shown if the bushing were cut transversely through the middle of the flange F, as shown in Fig. 3.

What I claim is—

1. The combination with the wheel-hub, of the removable bushing having an oil-chamber, which permits the oil to flow freely around the axis, and a flange provided with a peripheral groove extending in a plane other than the transverse planes of the oil-chamber and communicating with said chamber and with a hole or aperture that extends to the shaft-aperture, substantially as set forth.

2. The combination with the hub, of the removable bushing having an oil-chamber, which permits the oil to flow freely around the axis, and a flange projecting into said chamber and provided in its periphery with two grooves which partially extend therearound and in opposite directions, said grooves communicating with said chamber and with holes that extend to the shaft-aperture, substantially as set forth.

3. The combination with the hub, of the removable bushing having the central flange forming an oil-chamber at each end of the bushing, said central flange having formed in its periphery two grooves which extend part way around the same in opposite directions and each communicating with one of the oil-chambers and with a hole extending to the shaft-aperture, substantially as set forth.

4. The combination with the hub, of the bushing having end flanges and a flange between the ends thereby forming an oil-chamber at each end of the bushing, said intermediate flange having in its periphery a transverse passage connecting the oil-chambers, and two grooves extending from said transverse passage in opposite directions and communicating with holes opening into the shaft-aperture, substantially as set forth.

5. The combination with the hub, of the bushing having end flanges E, E', and a flange F between the ends, whereby an oil-chamber is formed on each side of the intermediate flange F, said intermediate flange having formed therein two oppositely-extending peripheral grooves and a transverse passage connecting each of said grooves with one of the oil-chambers, and having a portion $h^2$ thereof inclined to the other portions, substantially as set forth.

6. In a self-oiling device, the combination with a hub, of a bushing containing two oil-chambers which are separated by a diaphragm or wall closed around the axis at all points except a reduced passage-way, M, connecting said oil-chambers, there being formed in the wall or diaphragm a duct or hole which communicates with the passage, M, therein and with the shaft-aperture, substantially as set forth.

7. In a self-oiling device for wheels, the combination with a hub, of a bushing having formed therein an oil-chamber, which permits oil to flow freely around the axis, and having also a hole, that communicates with the shaft-aperture, and a groove extending at an angle to said hole, said groove being situated on a line farther from the axis than the bottom of the oil-chamber and having but one supply-orifice, substantially as set forth.

8. In a self-oiling device for wheels, the combination with a hub, of a bushing forming an oil-chamber that permits oil to flow freely around the axis of the wheel, said bushing having formed therein a hole which communicates with the shaft-aperture and with a groove lying in an arc or line curved around a part of the axis of the wheel, and a passage substantially parallel with the axis, connecting said groove with the oil-chamber, substantially as set forth.

In testimony whereof I affix my signature in presence of two witnesses.

HENRY B. DIERDORFF.

Witnesses:
W. E. RESTIEAUX,
H. B. ARNOLD.